(12) United States Patent
Chen et al.

(10) Patent No.: US 10,550,914 B2
(45) Date of Patent: Feb. 4, 2020

(54) CONCAVE-CONVEX ARC LINE GEAR MECHANISM FOR PARALLEL SHAFT TRANSMISSION

(71) Applicant: SOUTH CHINA UNIVERSITY OF TECHNOLOGY, Guangdong (CN)

(72) Inventors: Yangzhi Chen, Guangdong (CN); Li Yao, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 234 days.

(21) Appl. No.: 15/528,772

(22) PCT Filed: Dec. 31, 2015

(86) PCT No.: PCT/CN2015/100182
§ 371 (c)(1),
(2) Date: May 23, 2017

(87) PCT Pub. No.: WO2017/041400
PCT Pub. Date: Mar. 16, 2017

(65) Prior Publication Data
US 2018/0187750 A1     Jul. 5, 2018

(30) Foreign Application Priority Data

Sep. 8, 2015 (CN) .......................... 2015 1 0570926

(51) Int. Cl.
*F16H 1/08* (2006.01)
*F16H 1/06* (2006.01)
(Continued)

(52) U.S. Cl.
CPC .................. *F16H 1/08* (2013.01); *F16H 1/06* (2013.01); *F16H 35/16* (2013.01); *F16H 55/08* (2013.01);
(Continued)

(58) Field of Classification Search
CPC ...... F16H 1/06; F16H 1/08; F16H 2055/0893; F16H 55/08; F16H 55/17; F16H 35/16
(Continued)

(56) References Cited

U.S. PATENT DOCUMENTS 3,247,736 A * 4/1966 Roth .................... F16H 55/0806
74/424.5
3,269,205 A * 8/1966 Niemann ............ F16H 55/0826
74/458
(Continued)

FOREIGN PATENT DOCUMENTS

CN 101328967 12/2008
CN 102853054 2/2013
(Continued)

OTHER PUBLICATIONS

Dong Liang, Bingkui Chen, Yane Gao, Shuai Peng, and Siling Qin, "Geometric and Meshing Properties of Conjugate Curves for Gear Transmission," Mathematical Problems in Engineering, vol. 2014, Article ID 484802, 12 pages, 2014. https://doi.org/10.1155/2014/484802. (Year: 2014).*

*Primary Examiner* — Victor L MacArthur
*Assistant Examiner* — Joseph Brown
(74) *Attorney, Agent, or Firm* — Adam Warwick Bell; Matthew Rupert Kaser (57) ABSTRACT

The present invention relates to a concave-convex arc line gear mechanism for parallel shaft transmission, which comprises a driving line gear and a driven line gear, axes of the driving line gear and the driven line gear being parallel to each other to form a transmission pair.

7 Claims, 6 Drawing Sheets (51) Int. Cl.
  *F16H 35/16* (2006.01)
  *F16H 55/08* (2006.01)
  *F16H 55/17* (2006.01)

(52) U.S. Cl.
  CPC ...... *F16H 55/17* (2013.01); *F16H 2055/0893* (2013.01)

(58) Field of Classification Search
  USPC .................................................. 74/414, 458
  See application file for complete search history.

(56) References Cited

U.S. PATENT DOCUMENTS

| | | | | |
|---|---|---|---|---|
| 3,481,215 | A * | 12/1969 | Howell | F16H 1/08 74/424.5 |
| 4,552,030 | A * | 11/1985 | Szecsei | F16H 1/06 74/460 |
| 4,858,487 | A * | 8/1989 | Mercier | F16H 1/08 74/424.7 |
| 6,205,879 | B1 | 3/2001 | Litvin et al. | |
| 2009/0283062 | A1* | 11/2009 | Taye | F01L 13/0021 123/90.15 |
| 2010/0095792 | A1* | 4/2010 | Stanovskoy | F16H 1/08 74/414 |
| 2012/0291578 | A1 | 11/2012 | Stanovskoy | |
| 2013/0042711 | A1* | 2/2013 | Napau | F16H 55/082 74/417 |
| 2013/0145876 | A1* | 6/2013 | Chen | F16H 1/24 74/416 |
| 2014/0174231 | A1* | 6/2014 | Beirinckx | F16H 55/08 74/412 R |
| 2015/0330495 | A1* | 11/2015 | Goetz | F16H 55/08 74/423 |

FOREIGN PATENT DOCUMENTS

| | | |
|---|---|---|
| CN | 103075493 | 5/2013 |
| CN | 105114532 | 2/2015 |
| CN | 103047393 | 12/2015 |
| CN | 103939575 | 5/2016 |

* cited by examiner

CONCAVE-CONVEX ARC LINE GEAR MECHANISM FOR PARALLEL SHAFT TRANSMISSION

TECHNICAL FIELD

The present invention relates to the technical field of gear transmission technology and in particular, to a concave-convex arc line gear mechanism for parallel shaft transmission.

BACKGROUND

Gear transmission is the most widely used transmission and speed-changing technology. Line gear transmission pair may realize a transmission, including intersecting line gear or skew line gear at an arbitrary angle, and a high transmission ratio, and thus has advantages in applications. The previous line gear is also known as space curve meshing wheel, and the one participating in meshing in a transmission process is a pair of conjugate space curves, i.e., a pair of conjugate driving contact curve and driven contact curve; and tooth profile is circular, oval or oval ring, etc. The tooth profile moves along the contact curve to form line teeth of the line gear, and the line teeth and a cylindrical wheel body constitute the line gear. The line gear with such structure may obtain a high shape precision by adopting laser rapid prototyping technology. In order to achieve a better processing efficiency, numerical control machining method may be adopted to machine the line gear. However, since the line tooth of the aforesaid line gear has a spatial cylinder structure, and forms a cantilever beam structure with the wheel body, vibration occurs in the numerical control machining, resulting in a poor machining precision of the line teeth, and an insufficient bending strength of a tooth root. Accordingly, it is necessary to rationally change and optimize the line teeth structure of the line gear for the numerical control machining of the line gear. The present invention proposes a line gear with optimally designed line teeth, which is similar to an ordinary cylindrical gear except that the meshing theory is a pair of conjugate space curves meshing, and that two meshing tooth profile curves are inscribed in two circular arcs at a meshing point. The optimally designed line gear has high contact strength and bending strength, is easier to be numerical control machined, and is easier to be mass-produced.

SUMMARY OF THE INVENTION

The object of the present invention is to propose, against problems existing in the prior art in the field of mechanical transmission, a concave-convex arc line gear mechanism for parallel shaft transmission which has original advantages such as conjugate space curve meshing, high transmission ratio and compact construction that a line gear originally has, and has new characteristics such as high contact strength and bending strength, easy to be numerical control machined and easy to be mass-produced.

In order to realize the above-described object, technical solutions adopted by the present invention are as follows:

A concave-convex arc line gear mechanism for parallel shaft transmission comprises a driving line gear and a driven line gear, axes of the driving line gear and the driven line gear being parallel to each other to form a transmission pair. The driving line gear is consisted of convex gear teeth and a driving wheel body, a surface of the convex gear tooth comprising a pair of convex arc-shaped tooth flanks and a tooth top surface. The driven line gear is consisted of concave gear teeth and a driven wheel body, a surface of the concave gear tooth comprising a pair of concave arc-shaped tooth flanks and a tooth bottom surface.

Further, the convex line tooth of the driving line gear is formed by driving line tooth profile composed of two sections of arcs and a section of straight line moving along a driving contact curve and two driving line tooth thickness auxiliary curves. The concave line tooth of the driven line gear is formed by driven tooth profile composed of two sections of arcs and a section of straight line moving along a driven contact curve and two driven tooth thickness auxiliary curves. The driving contact curve and the driven contact curve are a pair of conjugate space curves which conform to space curve meshing equations. A tooth profile of the convex line teeth of the driving line gear and a tooth profile of the concave line teeth of the driven line gear are located on normal planes of the driving contact curve and the driven contact curve, respectively.

Further, a meshing track of the transmission pair during transmission is a space curve. One arc-shaped tooth flank of the driving wheel and one arc-shaped tooth flank of the driven wheel present a point contact of convex arc and concave arc at a meshing point.

Further, tooth shapes of the driving line gear and the driven line gear are interchangeable, i.e., the driving line gear has concave line teeth, while the driven line gear has convex line teeth.

Further, the driving wheel body and the driven wheel body are cylindrical wheel bodies. The driving line teeth project from the cylindrical wheel body. The driven line teeth are recessed into the cylindrical wheel body.

Further, the driving contact curve is a space helical curve, an equation of which in a coordinate system $o_1-x_1y_1z_1$ is as follows:

$$\begin{cases} x_M^{(1)} = m\cos t \\ y_M^{(1)} = m\sin t \\ z_M^{(1)} = n\pi + nt \end{cases},$$

wherein, t is a parameter, $$t \in [t_s, t_e], \Delta t = t_e - t_s, t_s = -\pi - \frac{\Delta t}{2}, t_e = -\pi + \frac{\Delta t}{2},$$

satisfying contact ratio condition:

$$\xi = \frac{\Delta t \times \text{number of teeth of driving wheel}}{2\pi} \geq 1;$$

m is a helical radius of the space helical curve, n is a parameter of a pitch of the space helical curve, and the pitch $p=2\pi n$.

The driven contact curve is a space curve conjugate with the driving contact curve, an equation of which in a coordinate system $o_2-x_2y_2z_2$ is as follows:

$$\begin{cases} x_M^{(2)} = -(m-a)\cos\dfrac{t+\pi}{i_{12}} \\ y_M^{(2)} = (m-a)\sin\dfrac{t+\pi}{i_{12}} \\ z_M^{(2)} = n\pi + nt \end{cases},$$

wherein, $i_{12}$ is a transmission ratio between the driving line gear and the driven line gear, and a is a center distance between two gears, $a=(1+i_{12})m$.

Further, the two driving tooth thickness auxiliary curves comprise a first driving tooth thickness auxiliary curve and a second driving tooth thickness auxiliary curve. The first driving tooth thickness auxiliary curve is located between the driving contact curve and the second driving tooth thickness auxiliary curve. An equation of the first driving tooth thickness auxiliary curve in the coordinate system $o_1$-$x_1y_1z_1$ is as follows:

$$\begin{cases} x_{M_{11}}^{(1)} = m\cos t - \dfrac{c_1 n \sin t}{\sqrt{n^2+m^2}} \\ y_{M_{11}}^{(1)} = m\sin t + \dfrac{c_1 n \cos t}{\sqrt{n^2+m^2}} \\ z_{M_{11}}^{(1)} = n\pi + nt - \dfrac{c_1 m}{\sqrt{n^2+m^2}} \end{cases};$$

an equation of the second driving tooth thickness auxiliary curve in the coordinate system $o_1$-$x_1y_1z_1$ is as follows:

$$\begin{cases} x_{M_{12}}^{(1)} = m\cos t - \dfrac{2c_1 n \sin t}{\sqrt{n^2+m^2}} \\ y_{M_{12}}^{(1)} = m\sin t + \dfrac{2c_1 n \cos t}{\sqrt{n^2+m^2}} \\ z_{M_{12}}^{(1)} = n\pi + nt - \dfrac{2c_1 m}{\sqrt{n^2+m^2}} \end{cases},$$

wherein, $2c_1$ is a normal tooth thickness of the driving line gear.

The two driving line tooth profile arcs are symmetrical about the first driving tooth thickness auxiliary curve, and a radius of the arc is $\rho_1$. At the meshing point, an angle between a line which connects the meshing point and an arc center and a binormal vector $\gamma$ of the driving contact curve is $\varphi$. The driving tooth profile straight line segment and the binormal vector $\gamma$ of the driving contact curve are parallel to each other. A distance between the driving tooth profile straight line segment and the binormal vector $\gamma$ is $h_{a1}$, $h_{a1}=h_a^* \times \rho_1(1-\sin\varphi)$, wherein $h_a^*$ is an addendum coefficient, a range of $h_a^*$ being 0.8~0.97. Length of the driving tooth profile straight line segment depends on the tooth thickness $2c_1$, the arc radius $\rho_1$, the angle $\varphi$ and $h_{a1}$, which is obtained by intercepting a specific distance $h_{a1}$ from a straight line with two driving tooth profile arcs.

Further, the two driven tooth thickness auxiliary curves comprise a first driven tooth thickness auxiliary curve and a second driven tooth thickness auxiliary curve. The first driven tooth thickness auxiliary curve is located between the driven wheel contact curve and the second driven tooth thickness auxiliary curve. An equation of the first driven tooth thickness auxiliary curve in the coordinate system $o_2$-$x_2y_2z_2$ is as follows:

$$\begin{cases} x_{M_{21}}^{(2)} = -(m-a)\cos\dfrac{t+\pi}{i_{12}} + \dfrac{c_2 n}{\sqrt{n^2+m^2}}\sin\dfrac{t+\pi}{i_{12}} \\ y_{M_{21}}^{(2)} = (m-a)\sin\dfrac{t+\pi}{i_{12}} + \dfrac{c_2 n}{\sqrt{n^2+m^2}}\cos\dfrac{t+\pi}{i_{12}} \\ z_{M_{21}}^{(2)} = n\pi + nt + \dfrac{c_2 m}{\sqrt{n^2+m^2}} \end{cases};$$

an equation of the second driven tooth thickness auxiliary curve in the coordinate system $o_2$-$x_2y_2z_2$ is as follows:

$$\begin{cases} x_{M_{22}}^{(2)} = -(m-a)\cos\dfrac{t+\pi}{i_{12}} + \dfrac{2c_2 n}{\sqrt{n^2+m^2}}\sin\dfrac{t+\pi}{i_{12}} \\ y_{M_{22}}^{(2)} = (m-a)\sin\dfrac{t+\pi}{i_{12}} + \dfrac{2c_2 n}{\sqrt{n^2+m^2}}\cos\dfrac{t+\pi}{i_{12}} \\ z_{M_{22}}^{(2)} = n\pi + nt + \dfrac{2c_2 m}{\sqrt{n^2+m^2}} \end{cases};$$

wherein, $2c_2$ is a normal tooth thickness of the driven line gear.

The two driven tooth profile arcs are symmetrical about the middle first driven tooth thickness auxiliary curve, and a radius of the arc is $\rho_2$. At the meshing point, an angle between a line which connects the meshing point and an arc center and the binormal vector $\gamma$ of the driven contact curve is $\varphi$. The driven tooth profile straight line segment and the binormal vector $\gamma$ of the driven contact curve are parallel to each other. A distance between the driven tooth profile straight line segment and the binormal vector $\gamma$ is $h_{f2}$, $h_{f2}=h_f^* \times h_{a1}$, wherein $h_f^*$ is a dedendum coefficient, range of $h_f^*$ being 1.4~2. Length of the driven tooth profile straight line segment depends on the tooth thickness $2c_2$, the arc radius $\rho_2$, the angle $\varphi$ and $h_{f2}$, which is obtained by intercepting a specific distance $h_{f2}$ from a straight line with two driven tooth profile arcs.

Further, a diameter of the driving wheel body is $d_{f1}$, with a value $d_{f1}=2m-2(h_{a1}+d_f^*)$, wherein $d_f^*$ is a clearance coefficient, range of $d_f^*$ being 0.5~2. A diameter of the driven wheel body is $d_{a2}$, with a value $d_{a2}=2(a-m)+2h_{a1}$.

Further, the arc radius $\rho_1$ of the two driving tooth profile arcs, the arc radius $\rho_2$ of the two driven tooth profile arcs and angle $\varphi$ satisfy following conditions:

$\rho_2 = k\rho_1$;

if $\varphi \in [30°, 40°]$, then $\rho_1 = \dfrac{1.1c_1}{\cos\varphi}, k \in \left(0, \dfrac{1}{4}\right)$; or $\rho_1 = \dfrac{1.2c_1}{\cos\varphi}$, $k \in \left(0, \dfrac{1}{5}\right)$; or $\rho_1 = \dfrac{1.4c_1}{\cos\varphi}$, $k \in \left(0, \dfrac{1}{7}\right)$; or $\rho_1 = \dfrac{1.6c_1}{\cos\varphi}, k \in \left(0, \dfrac{1}{11}\right)$;

if $\varphi \in (40°, 45°]$, then $\rho_1 = \dfrac{1.4c_1}{\cos\varphi}$, $k \in \left(0, \dfrac{1}{7}\right)$; or $\rho_1 = \dfrac{1.6c_1}{\cos\varphi}, k \in \left(0, \dfrac{1}{11}\right)$.

Compared with the prior art, the present invention has following advantages:

(1) high contact strength: gear teeth of the driving line gear and the driven line gear is in a concave-convex arc contact at the meshing point, the contact strength and bending strength are higher compared with previous line gear mechanism of two space cylindrical line tooth structures, and thus a greater load-bearing capacity is provided.

(2) high transmission ratio: minimum number of teeth of the driving line gear is 1, the transmission ratio is higher than that of the existing transmission mechanisms such as spur gear and helical gear, and a single-stage high contact ratio transmission with high transmission ratio may be realized.

(3) simple structure: the driving line gear and the driven line gear constitute a transmission pair, with a very simple transmission structure compared with traditional microminiature speed-changing mechanism; compared with spur gear and helical gear of traditional mechanical transmission, a compact construction may greatly save installation space.

BRIEF DESCRIPTION OF THE DRAWINGS

In the above figures: 1—tooth flank of driving line gear, 2—tooth top surface of driving line gear, 3—secondary tooth flank of driving line gear, 4—driving wheel body, 5—tooth flank of driven line gear, 6—tooth bottom surface of driven line gear, 7—secondary tooth flank of driven line gear, 8—driven wheel body, 9—driving contact curve, 10—first driving tooth thickness auxiliary curve, 11—second driving tooth thickness auxiliary curve, 12—first driving tooth profile arc, 13—driving tooth profile straight line segment, 14—second driving tooth profile arc, 15—driven contact curve, 16—first driven tooth thickness auxiliary curve, 17—second driven tooth thickness auxiliary curve, 18—first driven tooth profile arc, 19—driven tooth profile straight line segment, 20—second driven tooth profile arc.

DETAILED DESCRIPTION OF THE PREFERRED EMBODIMENT

The present invention is further described below in combination with the accompanying drawings, but the implementations of the present invention are not limited hereto.

Figure 1:
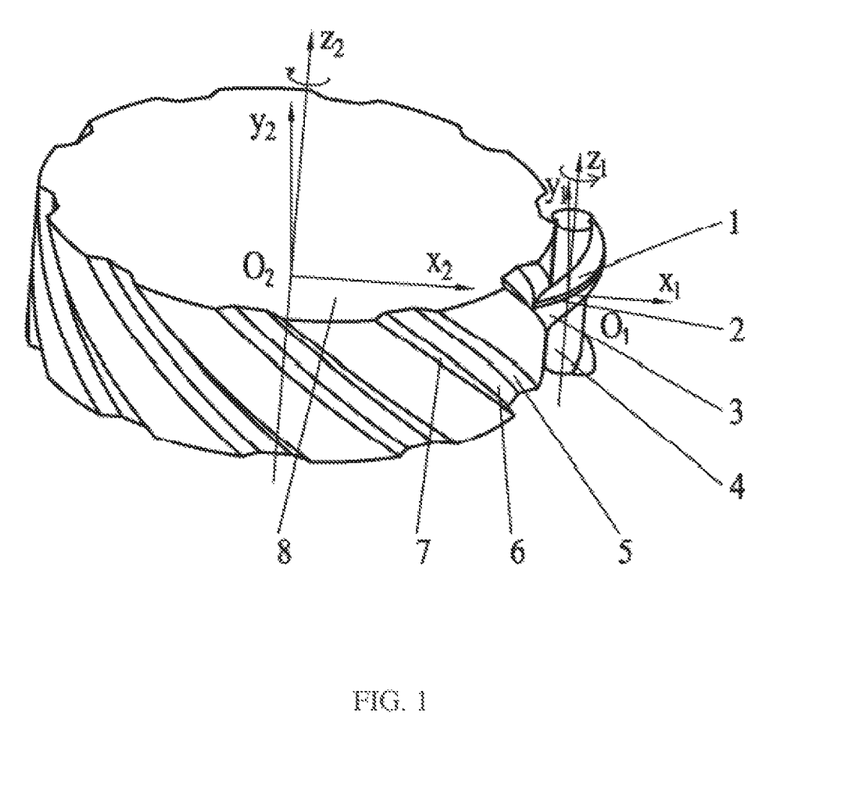
FIG. 1 is a schematic view of a concave-convex arc line gear mechanism for parallel shaft transmission according to an embodiment of the present invention.

Referring to FIG. 1, the present invention provides a concave-convex arc line gear mechanism for parallel shaft transmission, which comprises a driving line gear and a driven line gear, axes of the driving line gear and the driven line gear being parallel to each other to form a transmission pair. The driving line gear is consisted of convex gear teeth and a driving wheel body, a surface of the convex gear tooth comprising a pair of convex arc-shaped tooth flanks and a tooth top surface. The driven line gear is consisted of concave gear teeth and a driven wheel body, a surface of the concave gear tooth comprising a pair of concave arc-shaped tooth flanks and a tooth bottom surface.

Specifically, the convex tooth of the driving line gear is formed by driving tooth profile composed of two sections of arcs and a section of straight line 13 moving along a driving contact curve 9 and two driving tooth thickness auxiliary curves. The concave tooth of the driven line gear is formed by driven tooth profile composed of two sections of arcs and a section of straight line 19 moving along a driven contact curve 15 and two driven tooth thickness auxiliary curves. The driving contact curve 9 and the driven contact curve 15 are a pair of conjugate space curves which conform to space curve meshing equations. A tooth profile of the convex teeth of the driving wheel and a tooth profile of the concave teeth of the driven line gear are located on normal planes of the driving contact curve 9 and the driven contact curve 15, respectively.

Specifically, a meshing track of the transmission pair during transmission is a space curve. One arc-shaped tooth flank of the driving line gear and one arc-shaped tooth flank of the driven line gear present a point contact of convex arc and concave arc at a meshing point.

In addition, according to requirements, tooth shapes of the driving line gear and the driven line gear are interchangeable, i.e., the driving line gear has concave gear teeth, while the driven line gear has convex gear teeth.

Specifically, the driving wheel body and the driven wheel body are cylindrical wheel bodies. Driving teeth project from the cylindrical wheel body. Driven teeth are recessed into the cylindrical wheel body.

By means of setting different values of transmission ratio, the present embodiment may be applied in speed-increasing and speed-reducing transmissions. The axes of the driving line gear and the driven line gear are parallel to each other. Number of teeth of the driving line gear is 1, while number of teeth of the driven line gear is 10. A speed-reducing transmission with transmission ratio of 10:1 is realized in a meshing process.

See FIGS. 1, 2, 3, 4, 7 and 8 for structure of the driving line gear. A tooth flank 1, a driving tooth top surface 2 and a driving line gear secondary tooth flank 3 are distributed on the cylindrical driving wheel body 4. The convex tooth of the driving line gear is formed by a first driving tooth profile arc 12 and a second driving tooth profile arc 14 which are symmetrical and the driving tooth profile straight line segment 13 moving along the driving contact curve 9, a first driving tooth thickness auxiliary curve 10 and a second driving tooth thickness auxiliary curve 11. Arc radius of the first driving tooth profile arc 12 and the second driving tooth profile arc 14 is $\rho_1$. An angle between a line which connects the meshing point and an arc center and a binormal vector $\gamma$ of the driving contact curve 9 is $\varphi$. The driving tooth profile straight line segment 13 and the binormal vector $\gamma$ of the driving contact curve 9 are parallel to each other. A distance between the driving tooth profile straight line segment and the binormal vector $\gamma$ is $h_{a1}$. A-A section plane is the normal plane of the driving contact curve 9 at any point.

See FIGS. 1, 2, 5, 6, 7 and 8 for structure of the driven wheel. A plurality of gear teeth are distributed on the cylindrical driven wheel body 8. Each of the gear teeth is consisted of a driven tooth flank 5, a driven tooth bottom surface 6 and a driven secondary tooth flank 7. The concave tooth of the driven line gear is formed by a first driven tooth profile arc 18 and a second driven tooth profile arc 20 which are symmetrical and the driven tooth profile straight line segment 19 moving along the driven contact curve 15, a first driven tooth thickness auxiliary curve 16 and a second driven tooth thickness auxiliary curve 17. Arc radius of the first driven tooth profile arc 18 and the second driven tooth profile arc 20 is $\rho_2$. An angle between a line which connects the meshing point and an arc center and a binormal vector $\gamma$ of the driven contact curve 15 is $\varphi$. The driven tooth profile straight line segment 19 and the binormal vector $\gamma$ of the driven contact curve 15 are parallel to each other. A distance between the driven tooth profile straight line segment 19 and the binormal vector $\gamma$ is $h_{f2}$. B-B section plane is the normal plane of the driven contact curve at any point.

Figure 2:
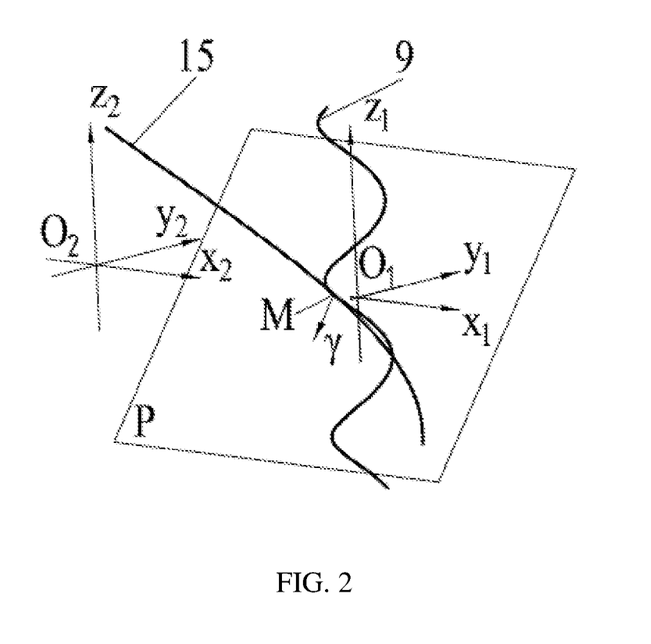
FIG. 2 is a schematic view of the driving contact curve and driven contact curve meshing at point M in FIG. 1.
Figure 3:
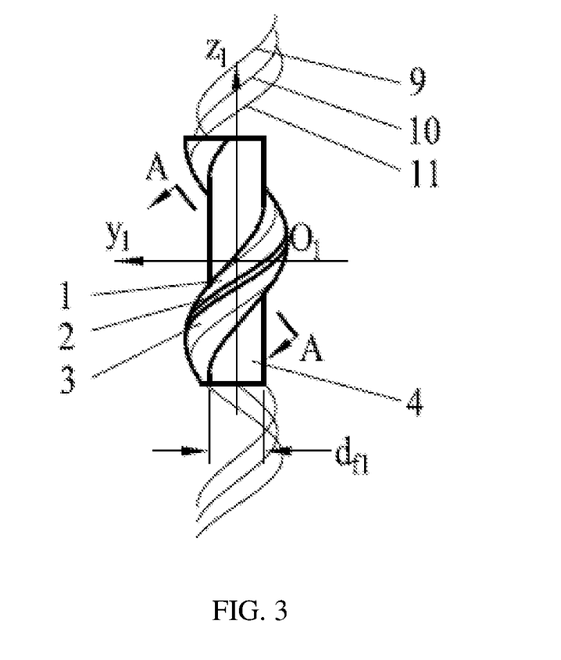
FIG. 3 is a left view of the driving line gear in FIG. 1.
Figure 4:
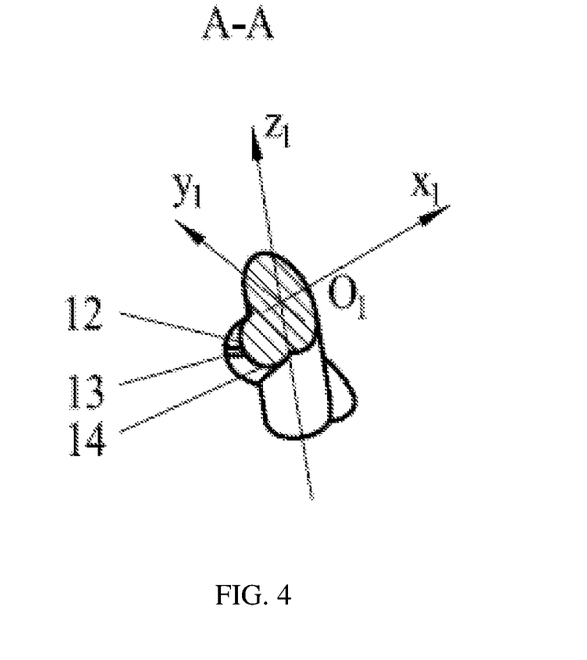
FIG. 4 is a three-dimensional schematic view of A-A section of the driving line gear in FIG. 3 sectioned by a normal plane P of the driving contact curve.
Figure 5:
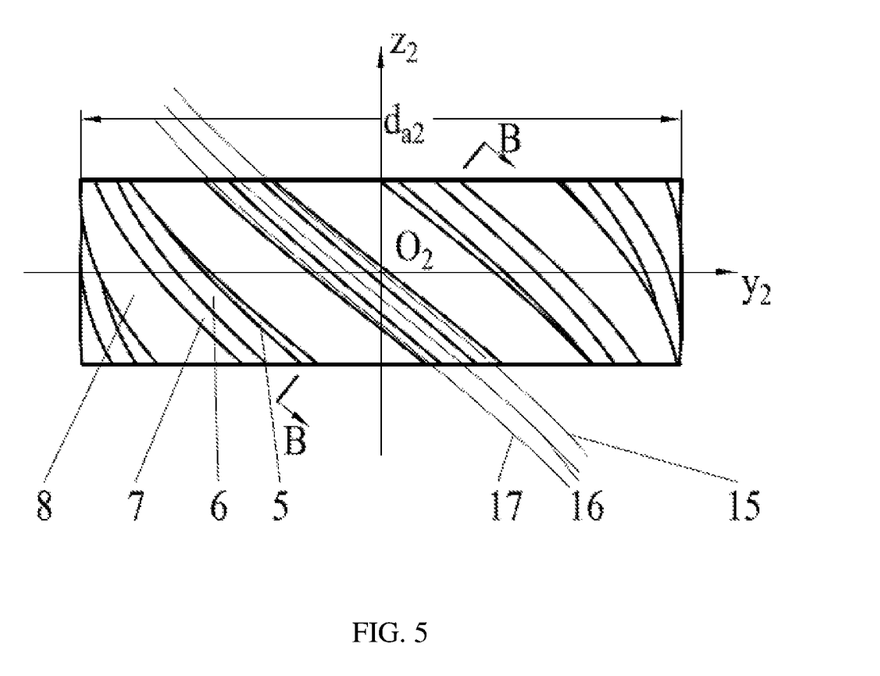
FIG. 5 is a right view of the driven wheel in FIG. 1.
Figure 6:
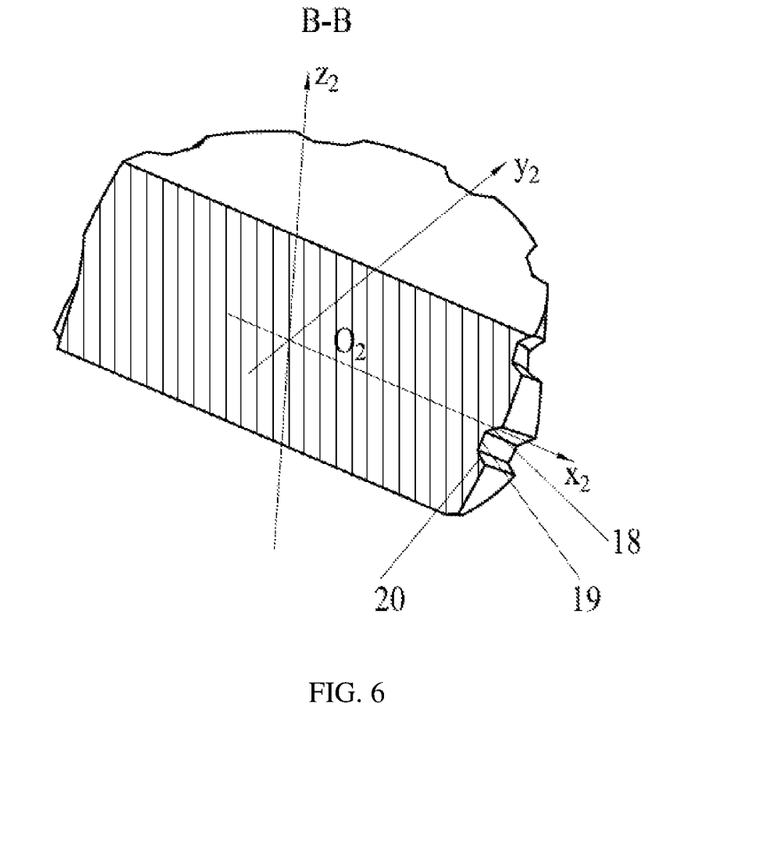
FIG. 6 is a three-dimensional schematic view of B-B section of the driven line gear in FIG. 5 sectioned by a normal plane P of the driven contact curve.
Figure 7:
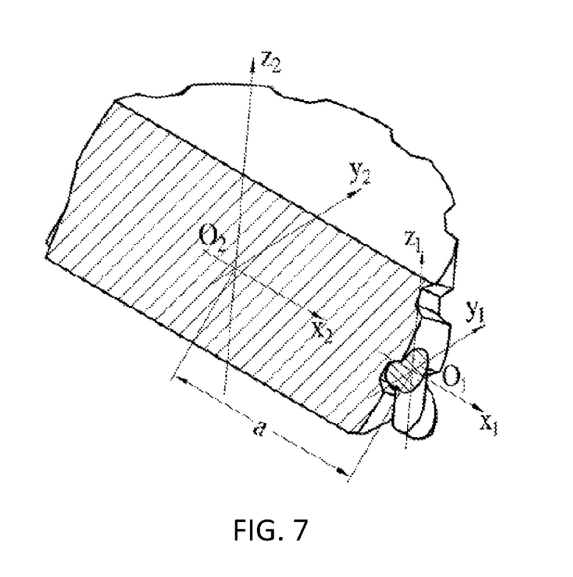
FIG. 7 is a three-dimensional schematic view of a section of the driving line gear and the driven line gear in FIG. 1 sectioned by a normal plane at the meshing point.
Figure 8:
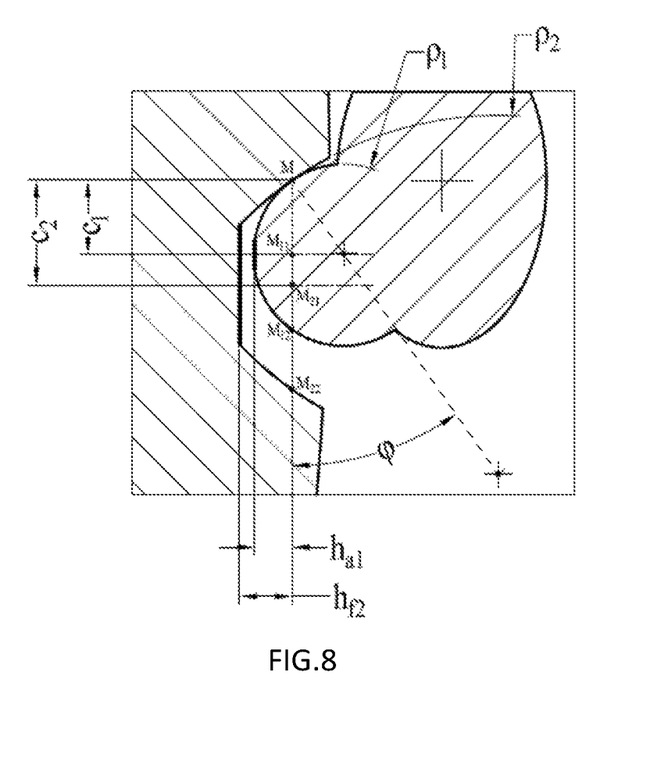
FIG. 8 is a partial enlarged view of a section of the driving line gear and the driven line gear in FIG. 7 sectioned by a normal plane at the meshing point.

The driving tooth flank 1 is in a point-contact meshing with the driven tooth flank 5 in a transmission process. Referring to FIGS. 2 and 8, on a normal plane P at the meshing point of a pair of driving contact curve 9 and driven contact curve 15, the driving tooth flank 1 is tangent to the driven tooth flank 5. M is a contact point, $M_{11}$ is an intersection point of the first driving tooth thickness auxiliary curve 10 of the driving line gear with the normal plane P, $M_{12}$ is an intersection point of the second driving tooth thickness auxiliary curve 11 of the driving line gear with the normal plane P, $M_{21}$ is an intersection point of the first driven tooth thickness auxiliary curve 16 of the driven line gear with the normal plane P, and $M_{22}$ is an intersection point of the second driven tooth thickness auxiliary curve 17 of the driven line gear with the normal plane P. M $M_{11}$ is equal to $M_{11} M_{12}$, with a value being half of tooth thickness of the driving line gear, i.e. $c_1$. M $M_{21}$ is equal to $M_{21} M_{22}$, with a value being half of tooth thickness of the driven line gear, i.e. $c_2$. The driving tooth flank 1 and the driving secondary tooth flank 3 are symmetrical about a midperpendicular at a midpoint $M_{11}$ of M and $M_{12}$, and the driven tooth flank 5 and the driven secondary tooth flank 7 are symmetrical about a midperpendicular at a midpoint $M_{21}$ of M and $M_{22}$. The gear teeth of the driving line gear and the gear teeth of the driven line gear have the same tooth profile on the normal planes P of respective contact curves.

Given parameters are set as follows: m=10 mm, n=8 mm, $i_{12}$=10, number of teeth of the driving line gear is 1, number of teeth of the driven line gear is 10, the tooth of the driving line gear has a tooth width $2c_1$=10 mm, the tooth of the driven line gear has a tooth width $2c_2$=14 mm, $\varphi$=35°, contact ratio $$\xi = \frac{\Delta t \times 1}{2\pi} = 1.25, \rho_1 = 6 \text{ mm}, \rho_2 = 24 \text{ mm};$$

it can be obtained that a center distance $$a = (1 + i_{12})m = 110 \text{ mm}, t \in \left[-\frac{9\pi}{4}, \frac{\pi}{4}\right], h_{a1} = 2.5 \text{ mm}, h_{f2} = 3.5 \text{ mm},$$

the driving wheel body 4 has a diameter $d_{f1}$=2m−2($h_{a1}$+ $d_f^*$)= 14 mm, and the driven wheel body 8 has a diameter $d_{a2}$=2(a−m)+2$h_{a1}$=205 mm;

an equation of the driving contact curve 9 in a coordinate system $o_1$−$x_1y_1z_1$ can be obtained as follows:

$$\begin{cases} x_M^{(1)} = 10\cos t \\ y_M^{(1)} = 10\sin t \\ z_M^{(1)} = 8\pi + 8t \end{cases};$$

an equation of the driven contact curve 15 in a coordinate system $o_2$−$x_2y_2z_2$ can be obtained as follows:

$$\begin{cases} x_M^{(2)} = 100\cos\dfrac{t+\pi}{i_{12}} \\ y_M^{(2)} = -100\sin\dfrac{t+\pi}{i_{12}} \\ z_M^{(2)} = 8\pi + 8t \end{cases};$$

equations of the first driving tooth thickness auxiliary curve 10 and the second driving tooth thickness auxiliary curve 11 of the driving line gear in the coordinate system $o_1$−$x_1y_1z_1$ are obtained as follows, respectively:

$$\begin{cases} x_{M_{11}}^{(2)} = 10\cos t - \dfrac{40\sin t}{\sqrt{164}} \\ y_{M_{11}}^{(2)} = 10\sin t + \dfrac{40\cos t}{\sqrt{164}} \\ z_{M_{11}}^{(2)} = 8\pi + 8t - \dfrac{50}{\sqrt{164}} \end{cases},$$

$$\begin{cases} x_{M_{12}}^{(2)} = 10\cos t - \dfrac{80\sin t}{\sqrt{164}} \\ y_{M_{12}}^{(2)} = 10\sin t + \dfrac{80\cos t}{\sqrt{164}} \\ z_{M_{12}}^{(2)} = 8\pi + 8t - \dfrac{100}{\sqrt{164}} \end{cases};$$

equations of the first driven tooth thickness auxiliary curve 16 and the second driven tooth thickness auxiliary curve 17 of the driven line gear in the coordinate system $o_2$−$x_2y_2z_2$ are obtained as follows, respectively:

$$\begin{cases} x_{M_{21}}^{(2)} = 100\cos\dfrac{t+\pi}{i_{12}} + \dfrac{56}{\sqrt{164}}\sin\dfrac{t+\pi}{i_{12}} \\ y_{M_{21}}^{(2)} = -100\sin\dfrac{t+\pi}{i_{12}} + \dfrac{56}{\sqrt{164}}\cos\dfrac{t+\pi}{i_{12}} \\ z_{M_{21}}^{(2)} = 8\pi + 8t + \dfrac{70}{\sqrt{164}} \end{cases},$$

$$\begin{cases} x_{M_{22}}^{(2)} = 100\cos\dfrac{t+\pi}{i_{12}} + \dfrac{112}{\sqrt{164}}\sin\dfrac{t+\pi}{i_{12}} \\ y_{M_{22}}^{(2)} = -100\sin\dfrac{t+\pi}{i_{12}} + \dfrac{112}{\sqrt{164}}\cos\dfrac{t+\pi}{i_{12}} \\ z_{M_{22}}^{(2)} = 8\pi + 8t + \dfrac{140}{\sqrt{164}} \end{cases}.$$

The line gear mechanism of the present invention has high contact strength, bending strength and great rigidity, possesses greater load-bearing capacity, can be machined by numerical control method and is easy to be mass-produced. Minimum number of teeth of the driving line gear is 1, the transmission ratio is higher than that of the existing transmission mechanisms such as spur gear and helical gear, and a single-stage high contact ratio transmission with high transmission ratio may be realized. Compared with spur gear and helical gear of traditional mechanical transmission, a compact construction may greatly save installation space, and thus it is suitable for conventional mechanical applications.

As described above, the present invention can be well implemented.

The above-described embodiments of the present invention are just examples for describing the present invention clearly, but not limitation to the implementations of the present invention. For those having ordinary skill in the art, variations or changes in different forms can be made on the basis of the above description. All of the implementations should not and could not be exhaustive herein. Any amendment, equivalent replacement and improvement made within the spirit and principle of the present invention shall all be included within the scope of protection of the claims of the present invention.

What is claimed:

1. A concave-convex arc line gear mechanism for a parallel shaft transmission comprising, a driving line gear and a driven line gear, axes of the driving line gear and the driven line gear being parallel to each other to form a transmission pair; the driving line gear comprising convex line teeth and a driving wheel body, a surface of a convex line tooth comprising a pair of convex arc-shaped tooth flanks and a tooth top surface and the driven line gear comprising concave teeth and a driven wheel body, a surface of a concave tooth comprising a pair of concave arc-shaped tooth flanks and a tooth bottom surface,
wherein the convex line tooth of the driving line gear is formed by a driving tooth profile composed of two sections of arcs and a section of a straight line moving along a driving contact curve and two driving tooth thickness auxiliary curves; the concave tooth of the driven line gear is formed by a driven tooth profile composed of two sections of arcs and a section of a straight line moving along a driven contact curve and two driven tooth thickness auxiliary curves; wherein the driving contact curve and the driven contact curve are a pair of conjugate space curves which conform to space curve meshing equations; and a tooth profile of the convex line teeth of the driving line gear and a tooth profile of the concave teeth of the driven line gear are located on normal planes of the driving contact curve and the driven contact curve, respectively,
and wherein the two driving tooth thickness auxiliary curves comprise a first driving tooth thickness auxiliary curve and a second driving tooth thickness auxiliary curve, the first driving tooth thickness auxiliary curve being located between the driving contact curve and the second driving tooth thickness auxiliary curve, with an equation of the first driving tooth thickness auxiliary curve in a coordinate system $o_1-x_1y_1z_1$ being as follows:

$$\begin{cases} x_{M_{11}}^{(1)} = m\cos t - \dfrac{c_1 n \sin t}{\sqrt{n^2+m^2}} \\ y_{M_{11}}^{(1)} = m\sin t + \dfrac{c_1 n \cos t}{\sqrt{n^2+m^2}} \\ x_{M_{11}}^{(1)} = n\pi + nt - \dfrac{c_1 m}{\sqrt{n^2+m^2}} \end{cases},$$

wherein, t is a parameter, $$t \in [t_s, t_e], \Delta t = t_e - t_s, t_s = -\pi - \dfrac{\Delta t}{2}, t_e = -\pi + \dfrac{\Delta t}{2},$$

satisfying a contact ratio condition:

$$\xi = \dfrac{\Delta t \times \text{number of teeth of driving wheel}}{2\pi} \geq 1;$$

m is a helical radius of the space helical curve, n is a parameter of a pitch of the space helical curve, and the pitch $p=2\pi n$;
an equation of the second driving tooth thickness auxiliary curve in the coordinate system $o_1-x_1y_1z_1$ being as follows:

$$\begin{cases} x_{M_{12}}^{(1)} = m\cos t - \dfrac{2c_1 n \sin t}{\sqrt{n^2+m^2}} \\ y_{M_{12}}^{(1)} = m\sin t + \dfrac{2c_1 n \cos t}{\sqrt{n^2+m^2}} \\ z_{M_{12}}^{(1)} = n\pi + nt - \dfrac{2c_1 m}{\sqrt{n^2+m^2}} \end{cases},$$

wherein, $2c_1$ is a tooth thickness of the driving gear tooth; the two driving tooth profile arcs are symmetrical about the first driving tooth thickness auxiliary curve, and a radius of the arcs are $\rho_1$; at a meshing point, an angle between a line which connects the meshing point and an arc center and a binormal vector $\gamma$ of the driving contact curve is $\varphi$; the driving tooth profile straight line segment section and the binormal vector $\gamma$ of the driving contact curve are parallel to each other, a distance between the driving tooth profile straight line segment section and the binormal vector $\gamma$ is $h_{a1}$, $h_{a1}=h_a^* \times \rho_1(1-\sin \varphi)$, wherein $h_a^*$ is an addendum coefficient, a range of $h_a^*$ being 0.8~0.97, and a length of the driving tooth profile straight line segment depends on the driving tooth thickness $2c_1$, the arc radius $\rho_1$, the angle $\varphi$ and $h_{a1}$, which is obtained by intercepting a specific distance $h_{a1}$ from a straight line with the two driving tooth profile arcs.

2. The concave-convex arc line gear mechanism for the parallel shaft transmission according to claim 1, wherein a meshing track of the transmission pair during transmission is a space curve; and one arc-shaped tooth flank of the driving line gear and one arc-shaped tooth flank of the driven line gear present a point contact of convex arc and concave arc at the meshing point.

3. The concave-convex arc line gear mechanism for the parallel shaft transmission according to claim 1, wherein tooth shapes of the driving line gear and the driven line gear are interchangeable.

4. The concave-convex arc line gear mechanism for the parallel shaft transmission according to claim 1, wherein the driving wheel body and the driven wheel body are cylindrical wheel bodies; and wherein the driving line teeth project from the cylindrical driving wheel body; and the driven line teeth are recessed into the cylindrical wheel body.

5. The concave-convex arc line gear mechanism for the parallel shaft transmission according to claim 4, wherein a diameter of the driving wheel body is $d_{f1}$, with a value $d_{f1}=2m-2(h_{a1}+d_f^*)$, wherein $d_f^*$ is a clearance coefficient, a range of $d_f^*$ being 0.5~2; and a diameter of the driven wheel body is $d_{a2}$, with a value $d_{a2}=2(a-m)+2h_{a1}$.

6. The concave-convex arc line gear mechanism for parallel shaft transmission according to claim 1, wherein the driving contact curve is a space helical curve, an equation of which in the coordinate system $o_1-x_1y_1z_1$ is as follows:

$$\begin{cases} x_M^{(1)} = m\cos t \\ y_M^{(1)} = m\sin t \\ z_M^{(1)} = n\pi + nt \end{cases}$$

wherein, t is the parameter, $$t \in [t_s, t_e], \Delta t = t_e - t_s, t_s = -\pi - \frac{\Delta t}{2}, t_e = -\pi + \frac{\Delta t}{2},$$

satisfying the contact ratio condition:

$$\xi = \frac{\Delta t \times \text{number of teeth of driving wheel}}{2\pi} \geq 1;$$

m is the helical radius of the space helical curve, n is the parameter of the pitch of the space helical curve, and the pitch p=2πn;

the driven contact curve is a space curve conjugate with the driving contact curve, an equation of which in a coordinate system $o_2$-$x_2y_2z_2$ is as follows:

$$\begin{cases} x_M^{(2)} = -(m-a)\cos\frac{t+\pi}{i_{12}} \\ y_M^{(2)} = (m-a)\sin\frac{t+\pi}{i_{12}} \\ z_M^{(2)} = n\pi + nt \end{cases},$$

wherein, $i_{12}$ is a transmission ratio between the driving line gear and the driven line gear, and a is a center distance between the two gears, $a=(1+i_{12})m$.

7. The concave-convex arc line gear mechanism for the parallel shaft transmission according to claim 1, wherein the two driven tooth thickness auxiliary curves comprise a first driven tooth thickness auxiliary curve and a second driven tooth thickness auxiliary curve, the first driven tooth thickness auxiliary curve being located between the driven contact curve and the second driven tooth thickness auxiliary curve, an equation of the first driven tooth thickness auxiliary curve in a coordinate system $o_2$-$x_2y_2z_2$ being as follows:

$$\begin{cases} x_{M_{21}}^{(2)} = -(m-a)\cos\frac{t+\pi}{i_{12}} + \frac{c_2 n}{\sqrt{n^2+m^2}}\sin\frac{t+\pi}{i_{12}} \\ y_{M_{21}}^{(2)} = (m-a)\sin\frac{t+\pi}{i_{12}} + \frac{c_2 n}{\sqrt{n^2+m^2}}\cos\frac{t+\pi}{i_{12}} \\ z_{M_{21}}^{(2)} = n\pi + nt + \frac{c_2 m}{\sqrt{n^2+m^2}} \end{cases},$$

wherein, t is the parameter, $$t \in [t_s, t_e], \Delta t = t_e - t_s, t_s = -\pi - \frac{\Delta t}{2}, t_e = -\pi + \frac{\Delta t}{2},$$

satisfying the contact ratio condition:

$$\xi = \frac{\Delta t \times \text{number of teeth of driving wheel}}{2\pi} \geq 1;$$

m is the helical radius of the space helical curve, n is the parameter of the pitch of the space helical curve, and the pitch p=2πn; and wherein, $i_{12}$ is a transmission ratio between the driving line gear and the driven line gear, and a is a center distance between the two gears, and wherein $h_{a1}$, is obtained by intercepting a specific distance $h_{a1}$ from a straight line with the two driving tooth profile arcs, and an equation of the second driven tooth thickness auxiliary curve in the coordinate system $o_2$-$x_2y_2z_2$ being as follows:

$$\begin{cases} x_{M_{22}}^{(2)} = -(m-a)\cos\frac{t+\pi}{i_{12}} + \frac{2c_2 n}{\sqrt{n^2+m^2}}\sin\frac{t+\pi}{i_{12}} \\ y_{M_{22}}^{(2)} = (m-a)\sin\frac{t+\pi}{i_{12}} + \frac{2c_2 n}{\sqrt{n^2+m^2}}\cos\frac{t+\pi}{i_{12}} \\ z_{M_{22}}^{(2)} = n\pi + nt + \frac{2c_2 m}{\sqrt{n^2+m^2}} \end{cases},$$

wherein, $2c_2$ is a tooth thickness of the driven line gear tooth;

the two driven tooth profile arcs are symmetrical about the first driven tooth thickness auxiliary curve, a radius of the arcs are $\rho_2$; at a meshing point, an angle between a line which connects the meshing point and an arc center and a binormal vector γ of the driven contact curve is φ; the driven tooth profile straight line section and the binormal vector γ of the driven contact curve are parallel to each other, a distance between the driven tooth profile straight line section and the binormal vector γ is $h_{f2}$, $h_{f2}=h_f^* \times h_{a1}$, wherein $h_f^*$ is a dedendum coefficient, a range of $h_f^*$ being 1.4~2, and a length of the driven tooth profile straight line segment depends on the tooth thickness $2c_2$, the arc radius $\rho_2$, the angle φ and $h_{f2}$, which is obtained by intercepting a specific distance $h_{f2}$ from a straight line with the two driven tooth profile arcs.

* * * * *